Patented Oct. 20, 1931

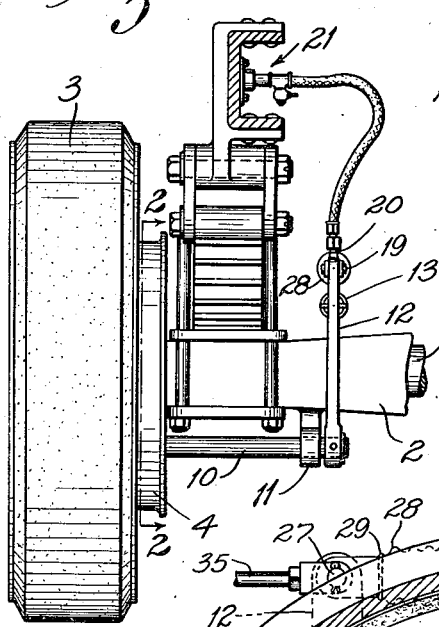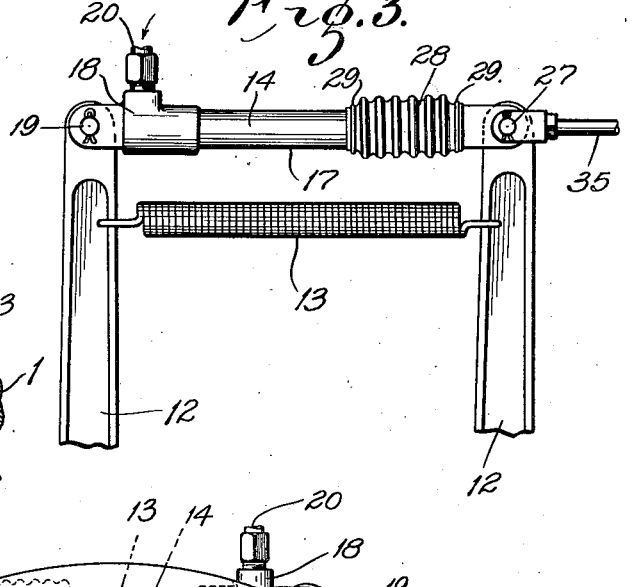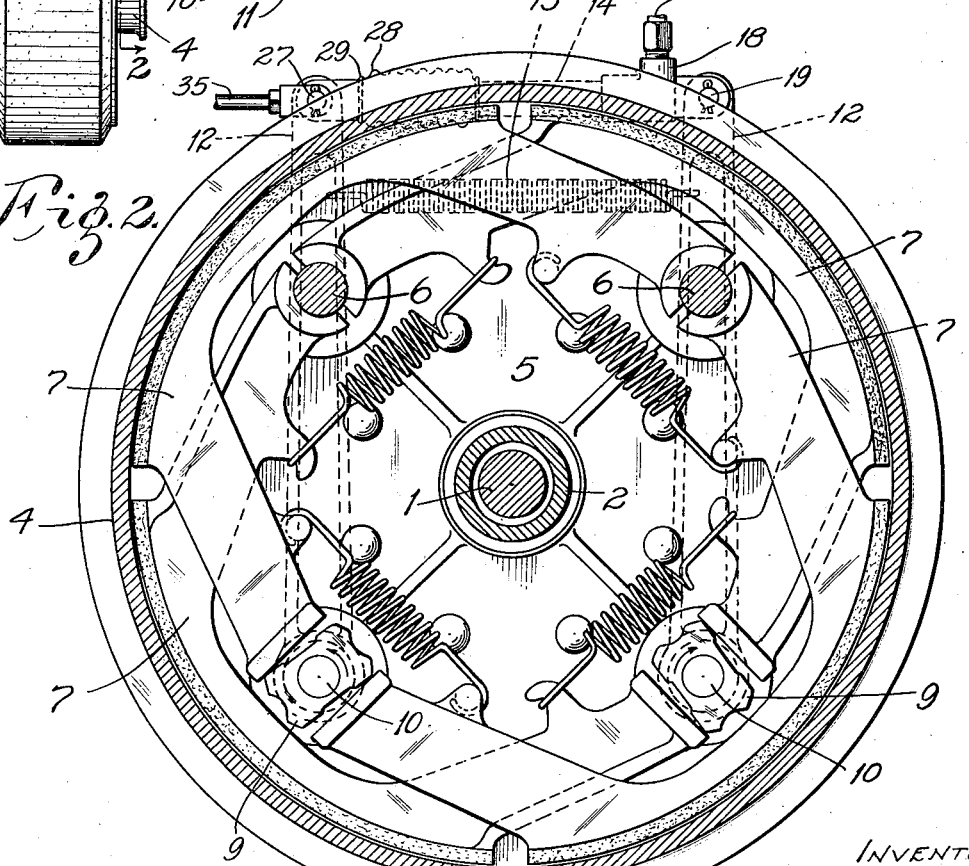

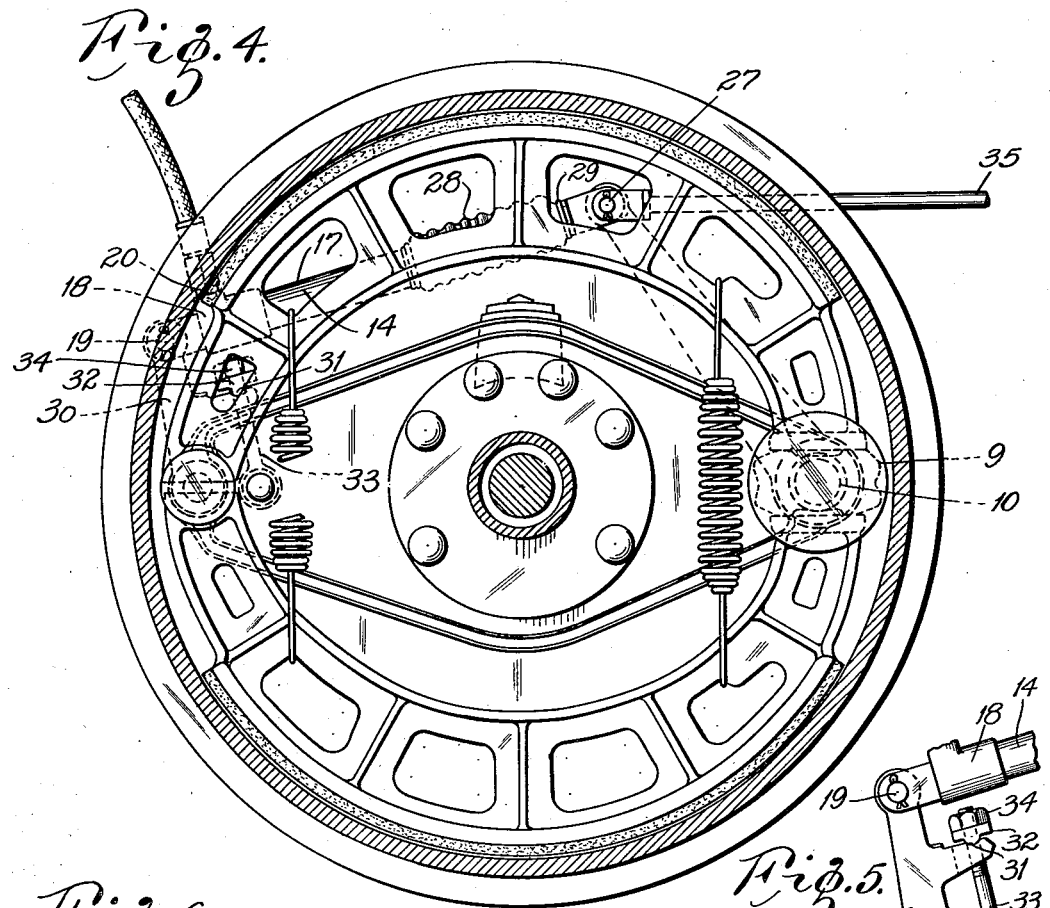

1,828,061

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

VEHICLE BRAKE

Application filed December 27, 1927. Serial No. 242,585.

My invention relates to brakes for motor vehicles and is especially applicable to brakes of the kind known as duplex brakes wherein there are a plurality of pairs of brake shoes or the like that cooperate with a single brake drum. The principal objects of the invention are to provide for the hydraulic operation of duplex blakes; to provide for the operation of one pair of brake shoes of such hydraulically operated duplex brake without affecting the other pair thereof; to provide for the adjustment of such duplex brake; to provide means of adjustment applicable to other types of automobile brake. The invention consists in the parts and in the combinations and arrangements of parts hereinafter described and claimed.

In the accompanying drawings wherein like numerals refer to like parts wherever they occur, Fig. 1 is an elevation of part of a vehicle provided with my invention, Fig. 2 is an enlarged vertical section on the plane indicated by the line 2—2 of Fig. 4 showing a duplex brake, Fig. 3 is a fragmentary detail view showing the brake levers and the mechanism for actuating the same, Fig. 4 is a view similar to Fig. 2 but showing a single pair of brake shoes, Fig. 5 is a detail view of an adjusting member, Fig. 6 is a longitudinal vertical sectional view of the brake actuating mechanism in its contracted position.

Fig. 7 is a longitudinal horizontal sectional view thereof in its extended position; and Fig. 8 is a longitudinal sectional view similar to Fig. 6, showing the position of the brake actuating mechanism when actuated by the pull rod.

The construction illustrated in Fig. 2 is a duplex brake of the kind more fully set forth in Letters Patent of Herbert W. Alden No. 1,135,148 dated April 13, 1915. In this figure, 1 represents a driving shaft section mounted in a housing 2 and operatively connected to the road wheel 3 upon which is secured a hollow brake drum 4. Fixed on the axle housing is a brake spider 5 which supports two pivot pins 6 upon each of which are mounted a pair of brake members 7 each of which has a segmental shoe that extends substantially one-quarter of the distance around the circumference of the brake drum, thus making four shoes arranged in pairs with the shoes of one pair alternating with the shoes of the other pair and preferably in the same plane, all as more fully described in said patent. In the gap between the free ends of the brake members of each pair is mounted an actuating cam 9 fixed on or integral with a cam shaft 10 suitably supported by the axle housing, as for instance by the brackets 11. Each of the cam shafts is provided with a lever arm 12, as set forth in said patent.

According to the present invention, the two cam actuating arms 12 extend upwardly on opposite sides of the axle housing and are connected together near their upper ends by a tension spring 13 that tends to pull the brake shoes clear of the drum when the brake is released. An elongated hollow cylinder 14 closed at one end and open at the other is pivotally mounted at its closed end on the free end of one of said lever arms. Extending inside of said cylinder is an elongated tubular member 15 which has a sliding fit therein and constitutes a piston therefor, its inner end being closed for this purpose, and its outer end being open to receive an elongated slide pin 16 which is pivotally mounted on the end of the other lever arm. Preferably the cylinder member comprises a straight tubular section 17 with a screwthread formed on one end and engaging a screwthread formed in a hollow end fitting 18 that has a pair of lugs projecting from its end and spaced apart to receive the end of the lever arm and perforated to receive the pivot pin 19 that passes through said lugs and said arm. The upper part of the end fitting of the cylinder has a perforated and threaded boss or extension to receive a pipe 20 that communicates with a suitable source 21 of fluid pressure, preferably hydraulic pressure. Preferably the tubular member of the cylinder extends to the end wall of the end fitting, in which case said tubular member is perforated or slotted in alinement with the pressure pipe whereby the interior of the cylinder communicates at all times with said pressure pipe through the opening 22 provided for the purpose.

The piston member 15 illustrated in the drawings comprises an elongated tubular member 23 whose inner end is provided with an interior screwthread which engages the screwthread of a cup or hollow plug 24 which also has a screwthread on its inner surface, which last mentioned thread is engaged by the threaded stem of a disk-like piston member 25 that has a sliding fit in said cylinder. A suitable limiting stop is used to prevent the piston from closing the communication between the cylinder and the pressure pipe. A suitable device for this purpose is a circumferential rib 26 on the other end of the piston member arranged to bear against the end of the cylinder before the inner end of the piston can reach and close the opening to the supply pipe.

The connection of the piston to the lever arm of the brake is conveniently made by means of a fitting in the form of an elongated slide pin or plug 16 that fits in the open end of the piston and has its projecting portion made in the form of a yoke which straddles the lever arm, to which it is pivotally connected by a pivot pin 27 extending therethrough. An expansible sleeve 28, consisting of a hollow transversely corrugated tube of flexible metal or other suitable material, encloses the other end portion of the cylinder and the adjacent portion of the piston, its ends being fastened to them respectively, as by having said end portions fitted into grooves on said members and secured therein by suitable binding rings 29. By this arrangement, the portion of the piston that enters the cylinder is fully protected from dust and the like.

The operation of the construction hereinbefore described is as follows: Normally the pull of the tension spring 13 on the lever arms 12 keeps the brake shoes clear of the brake drum and keeps the piston as far inside of the cylinder as the limiting flange thereof will permit, which position of the piston is indicated in Fig. 6. When the control device (which may be of any suitable type) is actuated, fluid pressure is admited from any suitable source of pressure through the pressure pipe into the end of the cylinder, whereby the pressure thus admitted into the cylinder reacts both against the closed end of the cylinder and against the piston therein, thereby causing relative endwise movement of one on the other with the result of spreading apart the lever arms and thereby rocking the actuating cams to spread the brake members and cause the brake shoes to frictionally engage the brake drum. As both lever arms are free to turn, both the cylinder and the piston move endwise but in opposite directions; and there is an automatic equalization of the pressures on the two pairs of brake members. When the fluid pressure is released, the tension spring 13 acting through the lever arms pulls the brake shoes clear of the drum and pulls the cylinder and the piston endwise of each other as far as the limiting flange permits.

In Fig. 4, my device is illustrated as applied to an ordinary brake consisting of a single pair of brake shoes. In this construction, the piston is pivotally mounted on the free end of the lever arm that actuates the cam shaft, but the cylinder member is pivotally mounted on a block or plate 30 that is firmly held in position but capable of limited adjustment. This plate (which is illustrated in detail in Fig. 5) is pivotally mounted preferably on the pivot pin of the brake members. It is in the form of a bell crank lever, one arm of which is pivotally connected to the cylinder and the other arm of which is provided with a notch 31 in which is seated the rib of a washer-like piece 32 mounted on a threaded bolt or link 33 that is provided with a threaded nut 34 adapted to bear against said washer. The bolt is pivotally mounted on the spider not far from the pivot pin for the brake members. By turning the nut, the bell crank piece may be turned on its pivot so as to shift the point of connection between it and the cylinder throughout a range of adjustment sufficient for practical requirements. Obviously the same means of adjustment is applicable to a duplex brake as well as to a brake with a single pair of brake shoes.

Although a brake may be arranged to be actuated by fluid pressure, it is desirable that it should also be responsive to mechanical actuation; and it is one of the great advantages of the construction hereinbefore described that it enables the same brake to be actuated mechanically independently of the fluid actuating system and without disturbing the same in any way. For this purpose, the lever arm of the single brake type illustrated in Fig. 4 is pivotally connected to a pull rod or link 35 that is mechanically connected to a hand lever or pedal or other convenient means for actuating the same. When a pull is exerted on the lever arm through the pull rod, the lever arm responds to said pull. This is possible because the elongated slide pin to which the lever arm is attached, is free to slide endwise in the piston, and also because the piston is free to slide endwise in the cylinder. In either case, the assembly of the cylinder, a piston and elongated slide pin is such as to constitute in effect a slip joint. This slip joint is of special importance in connection with the duplex brake, as illustrated in Fig. 3. In this construction, the pull rod of the mechanical actuating system is connected to the same lever arm that is connected to the piston member; and in consequence of this manner of connecting the parts, the action of the pull of the mechanical actuating system is limited exclusively to the pair of brake shoes that are actuated by this particular lever arm, the other pair of brake shoes being irresponsive to said pull by reason of the slip joint action above described.

What I claim is:

1. A brake comprising a brake drum, a plurality of pairs of brake members operatively related thereto, and each comprising a quadrantal shoe disposed between like shoes of the brake members of the other pair, separate actuating means comprising a lever arm for each pair, a fluid actuated device operatively connected to said lever arms to actuate said pairs simultaneously, and manually operable means operatively connected to one of said lever arms to actuate it independently of the other lever arm and independently of said fluid pressure.

2. A brake comprising a brake drum, a plurality of pairs of brake members arranged in the same vertical plane and operatively related to the inner surface of said drum, separate actuating means for each pair, a source of fluid pressure, a cylinder communicating with said source of pressure and connected to one of said actuating means, a piston for said cylinder operatively connected to the other actuating means and manually operable means operatively connected to one of said actuating means to actuate it independently of the other actuating means and independently of said fluid pressure.

3. The combination with a brake drum and a plurality of brake members associated therewith and each comprising a quadrantal shoe disposed between like shoes of the brake members of the other pair of lever arms arranged approximately ninety degrees apart for actuating said members respectively, means for actuating said lever arms together and means for actuating one of said lever arms independently of the other, said first actuating means consisting of a cylinder suitably connected to one arm, a link pivotally connected to the other arm and a hollow piston in said cylinder with its end normally abutting against said link, said link having its free end elongated and slidably entered in said piston.

4. The combination, with a brake drum and two pairs of brake members pivotally mounted in the upper quadrants of said drum and each member having a quadrantal brake shoe between and in the same vertical plane with the shoes of the brake members of the other pair of fluid actuated means for actuating said brake members together, and mechanically operated means for actuating one of said brake members independently, said fluid actuated means comprising lever arms extending upwardly from opposite the lower quadrants of said drum and a cylinder mounted in operative relation to one of said levers and a piston therefor in operative relation to the other lever.

Signed at Detroit, Michigan, this 20th day of Dec., 1927.

MATHEW B. MORGAN.